United States Patent [19]

Yoshikatsu et al.

[11] Patent Number: 4,808,463

[45] Date of Patent: Feb. 28, 1989

[54] SUBSTRATE FOR MAGNETIC DISKS

[75] Inventors: Okabayashi Yoshikatsu; Matsuda Osamu, both of Kagoshima, Japan

[73] Assignee: Kyocera Corporation, Kyoto, Japan

[21] Appl. No.: 888,794

[22] Filed: Jul. 22, 1986

Related U.S. Application Data

[63] Continuation-in-part of Ser. No. 687,185, Dec. 27, 1984, abandoned.

[30] Foreign Application Priority Data

Dec. 27, 1983 [JP] Japan ................. 58-245826

[51] Int. Cl.$^4$ ................. B32B 7/02; G11B 5/70
[52] U.S. Cl. ................. 428/215; 427/128; 427/131; 427/132; 428/432; 428/433; 428/469; 428/694; 428/216; 428/335; 428/336; 428/900; 428/64; 428/65; 428/698
[58] Field of Search ............ 428/64, 65, 694, 900, 428/432, 433, 336, 335, 216, 695, 318.4319.1, 428, 215, 469, 698; 427/128, 131, 132

[56] References Cited

U.S. PATENT DOCUMENTS

| 3,656,229 | 4/1972 | Sakural | 428/900 |
| 4,254,189 | 3/1981 | Fisher | 428/900 |
| 4,411,963 | 10/1983 | Aine | 427/131 |
| 4,448,842 | 5/1984 | Yamaguchi | 428/329 |
| 4,540,638 | 9/1985 | Sakakihara | 428/469 |
| 4,636,420 | 1/1987 | Wada | 428/156 |
| 4,690,846 | 9/1987 | Wada | 428/432 |

FOREIGN PATENT DOCUMENTS 50-51512  5/1975  Japan.
51-48302  4/1976  Japan.
57-138034  8/1982  Japan.

Primary Examiner—Ellis P. Robinson
Attorney, Agent, or Firm—Spensley, Horn, Jubas & Lubitz

[57] ABSTRACT

A substrate for magnetic disk comprises a ceramic support having a glaze layer formed on the surface which is to be coated with a magnetic recording material. The ceramic support may be made of alumina, and the glaze layer is made of a material having substantially the same expansion coefficient as that of the ceramic support. That material has a relatively high melting point.

21 Claims, 1 Drawing Sheet

SUBSTRATE FOR MAGNETIC DISKS

This is a continuation-in-part of application Ser. No. 687,185, filed on 12-27-84, now abandoned.

BACKGROUND OF THE INVENTION

The present invention relates to a substrate for magnetic disks using a ceramic support.

Magnetic disks as storage media play a key role in the information processing systems with computer. In order to meet the recent demand for magnetic recording of higher density and greater storage capacity, recording media of smaller thickness and higher surface precision are being fabricated by thin-film techniques such as sputtering.

Substrates for magnetic recording media are conventionally made of aluminum alloys and have an anodized aluminum coat of a general thickness of about 2 $\mu$m. This anodized aluminum coat provides an adequate hardness for the substrate surface, but due to the small thickness of this hard anodized aluminum layer and the difference in thermal expansion coefficient between the aluminum alloy and anodized aluminum, the dimensions of the substrate easily change as it is heated up. When a magnetic recording material is sputtered onto the substrate, sputtered ions or electrons impinge on the substrate and the resulting thermodynamic energy causes an increase in the substrate temperature. For coating with a mangetic recording material comprised of $\gamma$-$Fe_2O_3$ particles, the substrate is typically heated to 300° C. or higher. In either case, the temperature elevation increases the chance of dimensional instability in the aluminum substrate. When high-density recording is attempted with a magnetic medium formed on such defective aluminum substrate, writing or reading errors are highly likely to occur.

A magnetic disk system consists of platters which are stacked in a pack and are rotated about a spindle at a high speed of 1000 to 3000 rpm for reading and writing data. A substrate made of an aluminum alloy is highly stretchable by centrifugal force and this also causes increased writing or reading error in high-density magnetic recording.

As a further disadvantage, the aluminum alloy substrate, although its surface is usually anodized, has no less than 100 voids of a size of 2 to 3 $\mu$m over each side of the substrate of 5-inch diameter. These void defects are fatal to a high-density recording magnetic disk system and render accurate writing and reading impossible. Therefore, the development of a substrate for magnetic disks which has smaller void defect densities has long been a concern to the industry.

SUMMARY OF THE INVENTION

The present invention has been accomplished in order to solve these problems associated with the conventional substrates for magnetic disks.

The primary object of the present invention is to provide a magnetic disk substrate which can be subjected to sputtering or heat treatment without causing any dimensional instability, which will not stretch by centrifugal force, and which permits accurate writing and reading in high-density magnetic recording because of the use of a substrate undercoat having fewer void defects.

According to the present invention, a substrate for magnetic disk is provided which comprises a ceramic support having a glaze layer formed on the surface which is to be coated with a magnetic recording material.

DETAILED DESCRIPTION OF THE PREFERRED EMBODIMENTS

A preferred embodiment of the present invention is hereunder described by reference to the accompanying drawings.

Figure 1:
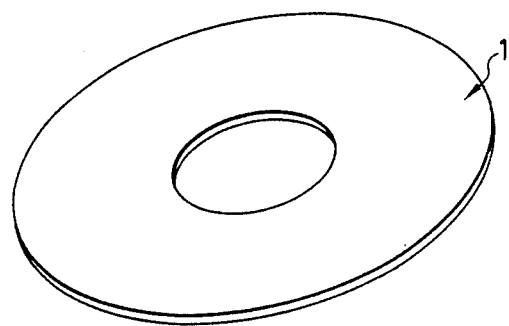
FIG. 1 is a perspective view of a substrate for magnetic disk according to the present invention.
Figure 2:
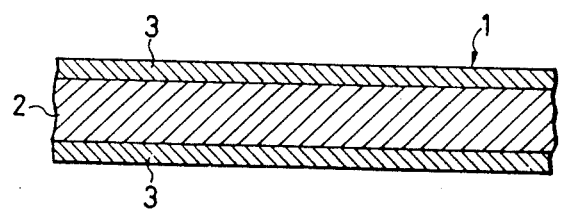
FIG. 2 is a cross section of the essential part of FIG. 1.

FIG. 1 is a perspective view of a typical substrate 1 according to the present invention. FIG. 2 is a cross section showing the essential part of this substrate 1, wherein a ceramic support 2 is coated on both sides with a glass glaze layer 3.

The present inventors have found that the problem of void defects generated in the aluminum alloy substrate can be effectively solved by using an undercoat made of a glassy material having relatively few void defects. As shown in FIGS. 1 and 2, the substrate of the present invention has a three-layered structure consisting of a ceramic support 2 which has formed on both sides a glaze layer 3 made of such glassy material. The ceramic support 2 has an appreciably lower modulus of elasticity than aluminum alloys and other metals, so according to the experiments conducted by the present inventors, a laminated substrate consisting of the ceramic support 2 and glass glaze layer 3 on each side experienced no elongation even when the substrate was subjected to centrifugal force due to high-speed rotation at 3,000 rpm.

The ceramic support 2 and glaze layer 3 should be such that they can withstand temperatures up to 500° C. with substantially no dimensional instability. Therefore, materials having practically the same thermal expansion coefficients are preferably selected for the ceramic support and glaze layer. Specific materials of the ceramic support 2 are any known oxide ceramics such as alumina, zirconia, barium titanate, beryllia (BeO), steatite ($MgO.SiO_2$) and forstellite ($2MgO.SiO_2$) and they may be single-crystal, polycrystalline or amorphous.

A polycrystalline ceramic support 2 is the least expensive, but using a polycrystalline species comprising crystals of an average size of not more than 100 $\mu$m is essential. The experiments conducted by the present inventors also revealed that when a polycrystalline ceramic support having an average crystal size exceeding 100 $\mu$m was coated with a glaze layer, pinholes and seeds or blisters were highly likely to occur in the glaze layer irrespective of the type of the polycrystalline material. An optimum average crystal size for the polycrystallized ceramic support is 60 $\mu$m or less.

The thickness of the glaze layer 3 is preferably not more than 150 $\mu$m. Experiments also showed that a glaze layer thicker than 150 $\mu$m could not be formed without introducing defects such as seeds and blisters. Furthermore, no uniform coating of the glass layer was possible. The glaze layer can be applied to the ceramic support through any one of a screen-painting method, a spray method, a roller method and a transfer method each of which per se is well known in the art.

The glaze layer 3 on the ceramic support 2 can be ground to a desired surface roughness before a magnetic recording material is coated on the glaze layer. The present inventors confirmed by experiments that the surface of the glaze layer could be polished to a centerline-average roughness (Ra) of 0.01 μm. Because of this high degree of surface smoothness, an extremely thin film of magnetic recording material can be formed on the substrate by sputtering or any suitable technique. The surface of the magnetic film is substantially free of excessive unevenness and hence can be used effectively in high density magnetic recording.

According to the substrate of the present invention, an intermediate layer that is not detrimental to the purpose of high-density magnetic recording may be provided between the ceramic support 2 and the glaze layer 3. The material of the intermediate layer should preferably have a thermal expansion coefficient close to those of the ceramic support and glaze layer.

To summarize, the substrate for magnetic disks according to the present invention has the following advantages. First, the substrate has much fewer void defects than the conventional aluminum alloy substrate because a glassy material is used as an undercoat for deposition of a magnetic recording material. Secondly, the ceramic support has such a high dimensional stability that it will not elongate even if the magnetic disk formed on it is subjected to centrifugal force by high-speed rotation. Thirdly, the substrate of the present invention will not suffer from any dimensional instability even if its temperature is increased during the fabrication of a magnetic recording medium. Because of these advantages, the substrate of the present invention is suitable for use with a magnetic disk that can perform high-density recording by accurate writing and reading.

As already mentioned, a glaze layer of good quality can be formed on a polycrystalline ceramic support if the latter has an average crystal size of not more than 100 μm.

Two working examples of the present invention are shown below.

EXAMPLE 1

A blend of alumina powder and a known sintering aid (e.g. silica) was pressed into compacts which were subsequently sintered at 1600°–1800° C. to form nine annular disks of polycrystalline alumina base (OD: 210 mm, ID: 100 mm, T: 1.85mm). These samples had varying average crystal sizes (see Table 1) by changing the grain size of the mix, its composition and sintering conditions. Each disk was polished on a diamond grid to a surface roughness of 7S or lower. Both sides of the disk were coated with a $SiO_2$-base glass powder, which was melted at 1350° C. and cooled to form a glaze layer 80 μm thick. The surface of the glaze layer was polished to a center-lineaverage roughness (Ra) of 0.01 μm. The glass powder from which the glaze layer was formed was a silicate glass with a $SiO_2$ content of at least 50% which was conditioned to have a thermal expansion coefficient that was the closest possible to that of the alumina base.

The number of defects such as pinholes, seeds and voids that occurred on both sides of each magnetic disk substrate sample was counted, and the results are shown in Table 1.

TABLE 1

| Substrate No. | Average crystal size μm | No. of defects |
|---|---|---|
| 1 | 5 | ≦100 |

TABLE 1-continued

| Substrate No. | Average crystal size μm | No. of defects |
|---|---|---|
| 2 | 10 | ≦100 |
| 3 | 25 | 100 |
| 4 | 45 | 100–200 |
| 5 | 65 | 300 |
| 6 | 90 | 300 |
| 7* | 110 | 400–500 |
| 8* | 135 | 600 |
| 9* | 150 | 600 |

Note:
The substrates with an asterisk were outside the scope of the present invention.

As is clear from Table 1, the number of defects having a diameter of 2μ or more increases with the increasing average crystal size. As will be shown later, up to about 300 defects were found to be tolerable for the purpose of high-density magentic recording. It is therefore concluded that substrate samples 1 to 6 having average crystal sizes of not more than 100 μm are desired for the purpose of the present invention. Among these, samples 1 to 4 having defect counts much smaller than 300 are particularly suitable for use as substrates adapted to high-density magnetic recording.

An $\alpha$-$Fe_2O_3$ film (thickness: 0.2 μm) was deposited on each substrate sample by reactive sputtering from a Co-containing Fe target. When the film was reduced in a hydrogen atmosphere at 320° C., it changed to $Fe_3O_4$. By subsequent aerial oxidation at 320° C., the film turned to a $\gamma$-$Fe_2O_3$ film. Each of the resulting magnetic disks was written and read by a head that could fly over the disk surface at a distances of 0.2 μm without hitting the disk. Disks formed on substrate samples 1 to 6 had much fewer signal errors than those formed on substrate samples 7 to 9. This shows the effectiveness of the substrate of the present invention in high-density recording with magnetic disks.

EXAMPLE 2

Alumina bases having the same composition as that of sample No. 3 (average crystal size: 25 μm) in Example 1 were prepared as in Example 1 except that they were glazed with a glass layer in varying thicknesses as shown in Table 2. The glaze layers were applied to the base in a screen painting method well known in the art. The respective glaze layers were polished to a center-line-average roughness of 0.01 m to fabricate six substrates for magnetic disks.

The number of defects such as seeds and voids, having a diameter of 2 μ or less, occurring in both sides of each substrate was counted, and the results are shown in Table 2.

TABLE 2

| Substrate No. | Thickness of glaze layer, μm | No. of defects |
|---|---|---|
| 10 | 10 | ≦100 |
| 11 | 35 | ≦100 |
| 12 | 78 | 100–200 |
| 13 | 110 | 100–200 |
| 14 | 145 | 300 |
| 15* | 166 | 600 |

Note:
The samples with an asterisk were outside the scope of the present invention.

As one can see from Table 2, the number of defects increases as the glaze layer becomes thicker. Substrate samples 10 to 14 had not more than 300 defects and magnetic recording media prepared by coating such substrates with $\gamma$-Fe$_2$O$_3$ film could be written and read by a heat, causing very few signal errors. However, a magnetic disk formed on substrate No. 15 with 600 defects caused a significant number of signal errors.

The effectiveness of using a glaze layer not thicker than 150 μm was confirmed not only with polycrystalline non-alumina bases but also with single-crystal and amorphous base of many other ceramic materials.

The present inventors also conducted experiments by using non-polycrystalline (single-crystal and amorphous) ceramic bases as the support for magnetic disk substrates. In this case, a glaze layer could be prepared from glass materials of such a nature that few void defects would be generated. Therefore, unlike the substrates prepared in Example 1, those prepared in Example 2 were substantially free of pinholes, seeds and blisters and thus could provide magnetic disks adapted to high-density recording.

As shown above, the substrate for magnetic disk according to the present invention comprises a ceramic base which has a glaze undercoat for deposition with a magnetic recording material. The substrate is dimensionally stabilized against sputtering or heat treatment. The substrate will not expand even if a great centrifugal force in applied to the magnetic disk. Therefore, the magnetic disk formed on this substrate is capable of accurate data writing and reading and achieves high-density recording with high reliability. Furthermore, the surface of the glaze layer on the ceramic base can be polished to a center-line-average roughness of 0.01 μm, and the number of defects that will develop in the glaze layer is much smaller than that of the defects occurring in the conventional aluminum alloy substrate. Not only single-crystal and amorphous ceramic bases can be used, but also even polycrystalline cermaics can be used without generating undesirably many defects if their average crystal size is made sufficiently small.

It is apparent that the present invention is not limited to a disk having the ceramic support but is equally applicable to a disk having a cermet support instead of the ceramic support. The cermet materials may include TiC-base, TiN-base, TiCN base, WC-base materials and any other well known materials. As is well known in the art, the cermet is a composite sintered material of ceramic and metal.

The magnetic material described above is Fe$_2$O$_3$ but may include CoNi-P (plating application) and CO-Ni (sputtering application).

As described before, the ceramic support 2 and glaze layer 3 should be such that they can withstand temperatures up to 500° C. with substantially no dimensional instability and materials having practically the same thermal expansion coefficients are preferably selected for the ceramic support and glaze layer. For example, in case of an alumina support, it is preferable that the alumina support contain 90% (by weight) or more alumina. In this case, its thermal expansion coefficient is in a range of $60-80 \times 10^{-7}$/°C. and it is preferable that the associated thermal coefficient of a glaze layer be in a range of $55-75 \times 10^{-7}$/°C., more preferably, $60-70 \times 10^{-7}$/°C. In any case, the thermal expansion coefficients are measured in the temperature range of 0° to 500° C.

To meet the above-described requirement, it is preferably that a difference in thermal expansion coefficient between the support and the glaze layer be in a range of $10 \times 10^{-7}$/°C. or less, more preferably, $5 \times 10^{-7}$/°C. or less.

In the foregoing explanation, it is preferable that the thermal coefficients between the support and the glaze layer should be substantially the same. However, it is also preferable that the thermal coefficient of the support is somewhat greater than that of the glaze layer. This structure makes it possible to generate compression stresses in the support per se and to strengthen the mechanical characteristics of the support to thereby prevent any generation of cracks in the glaze layer.

In the foregoing Example 1, the glaze layer is specified as a SiO$_2$-base glass having 50% or more SiO$_2$. However, according to the continuous efforts made by the inventors, it has been found that a glaze layer having the following specifications is preferable. For example, the glaze layer contains 50% by weight SiO$_2$, 25% by weight BaO, 12% by weight CaO, small percentages of B$_2$O$_3$, Al$_2$O$_3$ and ZnO and the balance. In this composition of the glaze layer, it is preferable to reduce the contents of Na$_2$O, K$_2$O and PbO as much as possible, in order to eliminate an adverse effect of corrosion of the magnetic medium to be applied thereon. More preferably, the total amount of Na$_2$O, K$_2$O, and PbO should be not greater than 1% by weight. The glaze layer having such a composition has a thermal expansion coefficient about $67 \times 10^{-7}$/°C. and a softening temperature of about 850° C.

In any case, it is preferable that difference in the thermal expansion coefficient between the glaze layer and the support is not greater than $10^{-6}$/°C. while meeting the requirement that the thermal expansion coefficient of the glaze layer be substantially equal to or less than that of the support.

According to another aspect of the present invention, the glaze layer may have a high melting point (generally speaking, a softening temperature more than 600° C.) as typically in the last-mentioned example of the composition of the SiO$_2$-base glass. It should be noted that the ceramic substrate having the high melting point is much superior in heat resistance. This makes it possible to attain a higher density recording, a higher performance and a higher reliability than those of the prior art disc.

More specifically, there is a recent demand that a thickness of a magnetic film becomes less and less, and for example, in case of a magnetic film produced by plating, deposition or sputtering, the thickness thereof has been less than 0.3 microns. For such an extremely thin magnetic film it is required to increase a hardness of the glazed layer per se, which becomes an underlayer for the magnetic film, in order to stand several tens of thousands of contact, start and stop actions (hereinafter to be referred to as CSS's) with respect to the magnetic head. Normally, a Vicker's hardness of the low melting point glass according to the prior art falls within a range of 400 to 500. Therefore, in the case where the magnetic film is formed on the glaze layer, the resultant product cannot stand the several tens of thousands of CSS's. In contrast, in case of a magnetic disc using a high melting point glass, due to the fact that the Vicker's hardness of the glass is in a range of about 800 to 1100, the resultant product may stand the several tens of thousands of CSS's.

Furthermore, the glaze layer has a high hardness as mentioned above, and hence, a high surface precision may be ensured by grinding the surface of the glass layer. Thus, according to the present invention, it is possible to keep the surface roughness (Ra) below 0.01 microns. By contrast, in accordance with the use of the low melting point glass, it would be very difficult to obtain such a surface precision even if the glass surface would be ground.

Also, if the magnetic film of the application type is used, it is necessary to burn and solidify the applied resin at approximately 200° C. Otherwise, if $\gamma$-Fe$_2$O$_3$ film is produced by sputtering, then a heating process at about 300 to 350° C. is needed. thus, when the magnetic film is formed on the substrate, the substrate per se is inherently heated. Therefore, a substrate which is superior in heat resistance is desired. In view of this fact, the high melting point glass is preferable because there is no fear that the substrate per se would be thermally deformed or changed in quality.

Also, since the low melting point glass contains, in general, Pb, Alkaline metals (Na, K, Li or the like), in the case where the metallic thick film is used as the magnetic film, the above-listed metal elements cause the film to be eroded particularly to a high temperature and a high hymidity. According to the present invention, such inherent defects of the prior art may be overcome.

I claim:

1. A substrate for magnetic disks comprising a support including at least a polycrystalline ceramic material having a crystalline particulate diameter of no greater than 100 $\mu$m and a glaze layer formed on at least one surface of said support, said glaze layer being coated with a magnetic recording material, wherein said support and said glaze layer have substantially the same thermal expansion coefficient and said support and said glaze layer can withstand temperatures up to 500° C. with substantially no dimensional instability wherein the glaze layer has a thickness of not greater than 150$\mu$m.

2. The substrate according to claim 1, wherein the thermal expansion coefficient of said glaze layer is in the range of $55-75 \times 10^{-7}/°$C.

3. The substrate according to claim 1, wherein the thermal expansion coefficient of said glaze layer is in the range of $60-70 \times 10^{-7}/°$C.

4. The substrate according to claim 1, wherein the thermal coefficient of said support is in the range of $60-80 \times 10^{-7}/°$C.

5. The substrate according to claim 1, wherein a difference in thermal coefficient between said support and said glaze layer is $10 \times 10^{-7}/°$C. or less.

6. The substrate according to claim 1, wherein a difference in thermal coefficient between said support and said glaze layer is $5 \times 10^{-7}/°$C. or less.

7. The substrate according to claim 1, wherein said support is made of alumina base material containing 90% by weight or more alumina.

8. The substrate according to claim 1, wherein said glaze layer is made of 50% SiO$_2$, 25% BaO, and 12% CaO by weight, small amounts of B$_2$O, Al$_2$O$_3$ and ZnO and the balance.

9. The substrate according to claim 1, wherein said glaze layer has a relatively high melting point.

10. The substrate according to claim 9, wherein said melting point is not lower than 600° C.

11. The substrate according to claim 1, wherein said glaze layer has a softening temperature of 850° C.

12. A substrate for magnetic disk comprising a support including at least a polycrystalline ceramic material having a crystalline particulate diameter of no greater than 100 $\mu$m and a glaze layer formed on at least one surface of said support, said glaze layer being coated with a magnetic recording material, wherein a thermal coefficient of said support is greater than that of said glaze layer and said support and said glaze layer can withstand temperatures up to 500° C. with substantially no dimensional instability wherein the glaze layer has a thickness of not greater than 150$\mu$m.

13. The substrate according to claim 12, wherein the thermal expansion coefficient of said glaze layer is in the range of $55-75 \times 10^{-7}/°$C.

14. The substrate according to claim 12, wherein the thermal expansion coefficient of said glaze layer is in the range of $60-70 \times 10^{-7}/°$C.

15. The substrate according to claim 12, wherein the thermal coefficient of said support is in the range of $60-80 \times 10^{-7}/°$C.

16. The substrate according to claim 12, wherein said support is made of alumina base material containing 90% by weight or more alumina.

17. The substrate according to claim 12, wherein said glaze layer is made of 50% SiO$_2$, 25% BaO, and 12% CaO by weight, small amounts of B$_2$O, Al$_2$O$_3$ and ZnO and the balance.

18. The substrate according to claim 12, wherein said glaze layer as a relatively high melting point.

19. The substrate according to claim 18, wherein said melting point is not lower than 600° C.

20. The substrate according to claim 12, wherein said glaze layer has a softening temperature of 850° C.

21. A substrate for magnetic discs comprising a support including at least a polycrystalline ceramic material having a crystalline particulate diameter of no greater than 100 $\mu$m and a glaze layer formed on at least one surface of said support, wherein said glaze layer has a relatively high melting point and said support and said glaze layer can withstand temperatures up to 500° C. with substantially no dimensional instability wherein the glaze layer has a thickness of not greater than 150$\mu$m.

* * * * *